United States Patent [19]

Ogata

[11] Patent Number: 4,895,817

[45] Date of Patent: * Jan. 23, 1990

[54] POLYCONDENSATION CATALYST

[75] Inventor: Naoya Ogata, Tokyo, Japan

[73] Assignee: The Goodyear Tire & Rubber Company, Akron, Ohio

[ * ] Notice: The portion of the term of this patent subsequent to May 26, 2004 has been disclaimed.

[21] Appl. No.: 207,465

[22] Filed: Jun. 16, 1988

Related U.S. Application Data

[60] Division of Ser. No. 45,497, May 4, 1987, Pat. No. 4,778,873, which is a continuation-in-part of Ser. No. 861,374, May 9, 1986, Pat. No. 4,668,762.

[51] Int. Cl.$^4$ .......................... B01J 31/02; B01J 31/06
[52] U.S. Cl. ..................................... 502/158; 502/159; 502/162; 502/167; 528/286
[58] Field of Search ................ 502/159, 162, 167, 158

[56] References Cited

U.S. PATENT DOCUMENTS

| | | | |
|---|---|---|---|
| 4,077,944 | 3/1978 | Weinberg et al. | 260/75 R |
| 4,156,072 | 5/1979 | Weinberg et al. | 528/279 |
| 4,668,762 | 5/1987 | Ogata | 528/286 |
| 4,778,873 | 10/1988 | Ogata | 528/286 |

FOREIGN PATENT DOCUMENTS 280600  4/1970  Fed. Rep. of Germany .

OTHER PUBLICATIONS

Chem. Ab., vol. 96, No. 23, Jun. 7, 1982, p. 685, 199793w.
Kitayama et al, "Synthesis of Aromatic Polyesters by Direct Polycondensation with Triphenylphosphine Dichloride", 22 J. Polymer Sci. Polymer Chemistry Ed., (1948), pp. 2705–2712.
Chem. Abstracts, vol. 69, No. 1, Jul. 1, 1968, p. 3676, 3670d.

*Primary Examiner*—Patrick P. Garvin
*Attorney, Agent, or Firm*—Alvin T. Rockhill

[57] ABSTRACT

Condensation polymers of high molecular weight, such as polyesters, polyureas, and polyamides, are usually prepared at temperatures of 200° C. or greater. However, by utilizing the catalyst system of the present invention condensation polymers can be synthesized at much lower temperatures. These catalyst systems are comprised of (1) a silicon-phosphorus composition which contains at least one divalent oxygen atom which is bonded directly to a tetravalent silicon atom and a trivalent or pentavalent phosphorus atom; and (2) at least one acid acceptor. For example, $P(OSiR_3)_3$ wherein R can be an aliphatic or aromatic hydrocarbon radical, can be used in conjunction with a basic solvent as a catalyst system. Polymeric agents having pendant diphenylphosphine dichloride groups can also be used in conjunction with an acid acceptor as a catalyst system.

16 Claims, No Drawings

POLYCONDENSATION CATALYST

This is a divisional of application Ser. No. 045,497, filed on May 4, 1987, now U.S. Pat No. 4,778,873, which is a Continuation-in-Part Application of Ser. No. 861,374, filed on May 9, 1986, now issued as U.S. Pat. No. 4,668,762.

BACKGROUND OF THE INVENTION

High molecular weight condensation polymers can be prepared by utilizing conventional polymerization techniques at elevated temperatures For example, nylon (66) can be prepared by polycondensing (polymerizing) hexamethylene diamine with adipic acid at a temperature of about 280° C and polybisphenol A carbonate can be prepared by polycondensing bisphenol A with diphenyl carbonate at a temperature of about 300° C. Condensation polymers of high molecular weight, such as polyesters, polyureas, and polyamides, are generally prepared at temperatures in excess of 200° C. The utilization of high temperatures in such synthesis techniques is, of course, an energy intensive process.

SUMMARY OF THE INVENTION

The present invention relates to a technique for preparing condensation polymers, such as polyamides, polyureas, and polyesters, which utilizes mild conditions at relatively low temperatures. Since low temperatures are utilized in this polymerization technique substantial energy savings can be attained. This technique utilizes a catalyst system which is comprised of (1) a silicon-phosphorus composition which contains at least one divalent oxygen atom which is bonded directly to a tetravalent silicon atom and a trivalent or pentavalent phosphorus atom; and (2) at least one acid acceptor Such polymerizations are normally carried out at a temperature of 0° C. to 150° C.

The present invention more specifically relates to a catalyst system which is particularly useful for the synthesis of condensation polymers which is comprised of (1) at least one silicon-phosphorus composition which contains at least one divalent oxygen atom which is bonded directly to a tetravalent silicon atom and a trivalent or pentavalent phosphorus atom; (2) at least one acid acceptor; and (3) at least one halogenated organic compound.

The present invention also reveals a catalyst system which is particularly useful in synthesizing condensation polymers which is comprised of (1) at least one polymeric agent having pendant diphenylphosphine dichloride groups; and (2) at least one acid acceptor.

The present invention also discloses a process for the synthesis of a polyester comprising polymerizing at least one dicarboxylic acid with at least one aromatic glycol in the presence of (1) a silicon-phosphorus composition which contains at least one divalent oxygen atom which is bonded directly to a tetravalent silicon atom and a trivalent or pentavalent phosphorus atom; and (2) an acid acceptor. The present invention further relates to a process for the synthesis of a polyester comprising polymerizing at least one dicarboxylic acid with at least one aromatic glycol in the presence of (1) at least one polymeric agent having pendant diphenylphosphine dichloride groups; and (2) at least one acid acceptor. These catalyst systems can also be used in the synthesis of polyesters from aromatic hydroxyl acids.

DETAILED DESCRIPTION OF THE INVENTION

There are numerous benefits that can be realized by utilizing the polymerization techniques of the present invention. Since low temperatures are utilized thermal degradation of the polymer being synthesized can be virtually eliminated. Such low temperature techniques also avoid many side reactions which occur at higher temperatures. The low temperature polymerization techniques of the present invention also make possible the synthesis of new polymers, for instance, polymers which contain thermally unstable moieties. Accordingly, crosslinkable polyesters and polyamides can be prepared which contain unstable groups such as aldehydes and thiols. It should also be possible to prepare crosslinkable polymers which contain double or triple bonds using the catalyst systems disclosed herein. By utilizing such low temperature synthesis techniques, substantial energy savings are, of course, also realized.

The silicon-phosphorus compounds which are used in the catalyst compositions of this invention contain at least one divalent oxygen atom which is bonded directly to a tetravalent silicon atom and to a trivalent or pentavalent phosphorus atom. Such silicon-phosphorus compounds have the general structural formula:

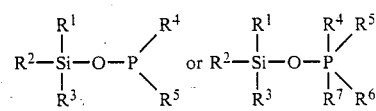

wherein $R^1$, $R^2$, $R^3$, $R^4$, $R^5$, $R^6$ and $R^7$ can be virtually any type of chemical moiety. For instance, $R^1$, $R^2$, $R^3$, $R^4$, $R^5$, $R^6$, and $R^7$ can be alkyl groups which contain from 1 to 20 carbon atoms, aryl groups which contain from 1 to 20 carbon atoms, alkylaryl groups which contain from 1 to 20 carbon atoms, hydrogen atoms, organometallic groups, or inorganic moieties. Additionally, $R^4$, $R^5$, $R^6$ and $R^7$ can be halogen atoms with the proviso that no more than 2 of such groups are halogen atoms. Chlorine, bromine, and iodine are particularly useful halogens in such silicon-phosphorus compounds. These groups can have a cyclic structure. In fact, these moieties can be multiply bonded to the silicon and/or phosphorus atoms. The number of possible compositions and structures for such silicon-phosphorus compounds is virtually unlimited.

Silicon-phosphorus compounds having the structural formula:

$$P(OSiR_3)_3$$

wherein R is an alkyl group containing from 1 to 20 carbon atoms are very effective in the catalyst systems of the present invention. In most cases the alkyl groups in such compounds will contain from 1 to 8 carbon atoms. For instance, tris(trimethyl silil) phosphite has been used in the catalyst systems of this invention with great success. R can also represent aryl groups or alkylaryl groups which contain from 1 to 20 carbon atoms. Silicon-phosphorus compounds having the structural formula:

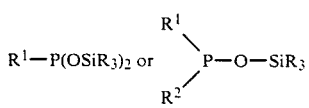

wherein R, $R^1$ and $R^2$ can be the same or different and are selected from the group consisting of alkyl groups containing from 1 to 20 carbon atoms, aryl groups containing from 1 to 20 carbon atoms, and alkylaryl groups containing from 1 to 20 carbon atoms, are also useful in the catalyst systems of the present invention. In most cases, R, $R^1$, and $R^2$ will contain from 1 to 8 carbon atoms.

Silicon-phosphorus compounds having the structural formula:

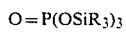

wherein R is selected from the group consisting of alkyl groups, alkylaryl groups and aryl groups containing from 1 to 20 carbon atoms can also be used in such catalyst systems. Similarly, silicon-phosphorus compounds having the structural formula:

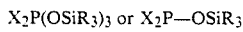

wherein X is a halogen atom and wherein R is selected from the group consisting of alkyl groups, alkylaryl groups and aryl groups containing from 1 to 20 carbon atoms, can also be used. Polymeric silicon-phosphorus compositions can also be utilized. For instance, polymers having the structural formula:

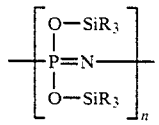

wherein R is an alkyl group, an aryl group or an alkylaryl group and wherein n is an integer can be used in such catalyst systems. In most cases R will be an alkyl group containing from 1 to 8 carbon atoms or a phenol group. Generally, n will be an integer from about 10 to about 1000. Another polymeric silicon-phosphorus composition that can be used has the structural formula:

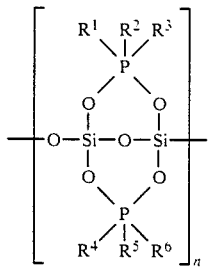

wherein n is an integer and wherein Rhu 1l, $R^2$, $R^3$, $R^4$, $R^5$, and $R^6$ can be the same or different and are selected from alkyl groups, alkylaryl groups and aryl groups which contain from 1 to 20 carbon atoms. In most cases, n will be an integer from about 10 to about 1000.

In addition to the silicon-phosphorus composition, these catalyst systems also contain an acid acceptor and a halogenated organic compound. The acid acceptors which can be used are typically organic bases which have a pKa of at least 5. Most commonly such organic bases have a pKa within the range of 5 to 12. The halogenated organic compounds which can be used generally contain at least one carbon atom which has at least two halogen atoms bonded directly to it. Preferably such halogenated organic compounds will contain one or more carbon atoms which have at least three halogen atoms bonded directly to them, such as trichloromethane. Halogenated organic compounds which have a carbon atom with four halogen atoms bonded directly to it, such as carbon tetrachloride and carbon tetrabromide, are most preferred for use in the catalyst systems of the present invention. Silicon-phosphorus compounds which contain halogen atoms can serve the dual purpose of providing both the silicon-phosphorus compound component and the halogenated organic compound component of the catalyst system.

The acid acceptor and the phosphorus containing compound can be employed in amounts which result in there being approximately equal molar amounts of acid acceptor groups, phosphorus atoms (in the phosphorus containing compound component), and monomers in the polymerization system.

It has been determined that a molar ratio of phosphorus atoms to monomer of about 1.2:1 is optimal. In most cases a molar ratio of phosphorus atoms to monomer which is within the range of about 0.8:1 to about 2:1 will be used. It is preferred for the molar ratio of phosphorus atoms to monomer to be within the range of 1.0:1 to 1.5:1. The molar ratio of acid acceptor groups to monomer will generally be at least 1:1. Large excesses of acid acceptor wherein the ratio of acid acceptor groups to monomer is much greater than 1:1 can be used without creating problems. For example, an organic base, such as pyridine, can be used as the solvent in the reaction medium. Ratios of acid acceptor groups to monomer of less than 1:1 can be used but conversions will be reduced. In most cases at least one mole of reactive halogen atoms (in the halogenated organic compound) will be employed per mole of monomer. For example, at least 1 mole of tetrachloromethane (carbon tetrachloride) or at least ½ mole of hexachloroethane could be employed per mole of monomer. A ratio of reactive halogen atoms to monomer of less than 1:1 will reduce conversions in the polymerization but large ratios of acid acceptor groups to monomer which are greatly in excess of 1:1 are not detrimental. Typically the polymerization will be conducted in an inert organic solvent. Any inert organic solvent which provides sufficient solubility can be utilized. Aromatic organic solvents, such as pyridine or alkyl substituted pyridines (picoline or lutidine) will typically be employed because they normally provide good solubility. Dimethylformamide is an example of an aliphatic liquid that provides good solubility. The reaction mediums utilized in the polymerizations of this invention are comprised of the inert organic solvent, the catalyst system and the monomers being polymerized. Such reaction mixtures normally contain from about 0.05 to 1 moles of monomer per liter of solution. However, it is permissible to utilize the maximum amount of monomer which is soluble in the particular organic solvent being used. More typically such reaction mixtures will contain from about 0.1 to about 0.5 moles of monomer per liter of solution.

The polymerizations of this invention will normally be carried out at a temperature between about 0° C and about 150° C. Preferably such polymerizations will be conducted at a temperature of from 50° C. to 80° C.

Catalyst systems which utilize a polymeric agent having pendant diphenyl phosphine dihalide groups in conjunction with an acid acceptor can also be used. Such pendant diphenylphosphine dihalide groups can be represented by the structural formula:

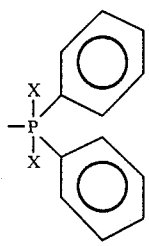

wherein X represents a halide atom. The polymeric backbone to which such diphenylphosphine dihalide groups are bonded is not of great importance. In fact, the diphenylphosphine dihalide groups can be bonded to either inorganic or polymeric organic substances. For instance, inorganic glasses which have such diphenylphosphine dihalide groups bonded to them work well in such catalyst systems. Organic polymers, such as polystyrene can also be used to support pendant diphenylphosphine dihalide groups. Normally the diphenylphosphine dihalide will be diphenylphosphine dichloride. The triphenylphosphine dihalide transforms into a triphenylphosphine oxide after the polycondensation and the triphenylphosphine oxide can be converted back to a triphenylphosphine dihalide by treatment with either an oxalyl halide

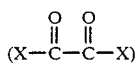

or a carbonyl dihalide

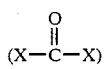

at a temperature from 0° C. to 50° C.

The polyamides made in accordance with the present invention are prepared by reacting one or more diamines with one or more dicarboxylic acids. The polyesters made in accordance with the present invention are prepared by reacting one or more aromatic diols with one or more dicarboxylic acids. The term "aromatic diols" as used herein is also deemed to include aromatic glycol ethers (diethers) and aromatic polyether glycols.

The dicarboxylic acids utilized in the preparation of such polyesters and polyamides are normally alkyl dicarboxylic acids which contain from 4 to 36 carbon atoms, aryl dicarboxylic acids which contain from 8 to 20 carbon atoms, and alkyl substituted aryl dicarboxylic acids which contain from 9 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. The preferred aryl dicarboxylic acids contain from 8 to 16 carbon atoms. Some representative examples of aryl dicarboxylic acids are terephthalic acid, isophthalic acid, and orthophthalic acid. The preferred alkyl substituted aryl dicarboxylic acids contain from 9 to 16 carbon atoms.

The diamine component utilized in the preparation of polyamides is normally a diamine that contains from 2 to 12 carbon atoms Preferred diamines normally contain from 2 to 8 carbon atoms with preferred diamines containing from 4 to 8 carbon atoms. Some representative examples of diamines that can be utilized in the synthesis of polyamides include ethylene diamine, hexamethylenediamine, bis(4-amino-cyclohexyl)-methane, o-phenyldiamine, m-phenylenediamine, p-phenylenediamine, 1,2-diamino-3,5-dichlorobenzene, 1,3-diamino-2,5-dichlorobenzene, 1,2-diamino-4-methylbenzene, 1,4-diamino-2-isopropylbenezene, 1,3-diaminopropane, 1,4-diaminobutane, and the like.

The diol component utilized in making aromatic polyesters in accordance with the present invention are aromatic diols which normally contain from 6 to 20 carbon atoms. Bisphenol A is a good example of an aromatic diol that can be used. Some other aromatic diols which can be used include 1,2-dihydroxybenzene (catechol), 1,3-dihydroxybenzene (resorcinol), 1,4-dihydroxybenzene (hydroquinone), 1,2-dihydroxy-3,5-dimethylbenzene, 1,2-dihydroxy-4,5-dimethylbenzene, 1,4-dihydroxy-2,3-dimethylbenzene, 2,4-dihydroxy-1-ethylbenzene, 2,4-dihydroxy-1-hexylbenzene, 1,4-dihydroxy-2-iodobenzene, 1,2-dihydroxy-4-isopropylbenzene, 1,4-dihydroxy-2-isopropylbenzene, 1,4-dihydroxy-2-isopropyl-5-methylbenzene, 1,3-dihydroxy-2-methylbenzene, 2,4-dihydroxy-1-(3-methyl-butyl)benzene, 2,4-dihydroxy-1-(4-methylpentyl)benzene, 1,3-dihydroxy-4-pentylbenzene, 1,3-dihydroxy-5-pentylbenzene, 1,4-dihydroxy-2,3,5,6-tetrabromobenzene, 1,3-dihydroxy-2,4,5,6-tetrachlorobenzene, 1,4-dihydroxy-2,3,5,6-tetramethylbenzene, and the like.

The polyesters and polyamides which are prepared utilizing the catalyst system of the present invention can be made in a manner so as to induce branching. Such branching is normally attained by utilizing a branching agent in the synthesis of the polyester or polyamide. Such branching agents normally contain three or more functional groups and preferably contain three or four functional groups. The reactive groups may be carboxyl or aliphatic hydroxyl. The branching agent can contain both types of groups. Examples of acidic branching agents include trimesic acid, trimellitic acid, pyromellitic acid, butane tetracarboxylic acid, naphthalene tricarboxylic acids, cyclohexane-1,3,5-tricarboxylic acids, and the like. Some representative examples of hydroxyl branching agents (polyols) include glycerin, trimethylol propane, pentaerythritol, dipenterythritol, 1,2,6-hexane triol, and 1,3,5-trimethylol benzene. Generally, from 0 to 3 percent of a polyol containing from 3 to 12 carbon atoms will be used as the branching agent (based upon the total diol component).

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

Tris(trimethyl silil) phosphite (TMSP) was synthesized by reacting trimethyl silil chloride with phosphorus acid in tetrahydrofuran in the presence of triethyl amine. This reaction is illustrated as follows:

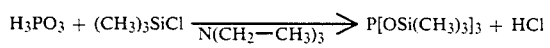

This reaction was carried out by adding 166 grams of trimethyl chlorosilane to a solution containing 40 grams of phosphorus acid. The solvent used in this experiment was a mixture of 400 ml of tetrahydrofuran and 1,600 ml of dry diethyl ether. One hundred fifty-five grams of triethyl amine was added drop by drop to the solution formed over a period of 1.5 hours. The solution was then refluxed for 6 hours. After filtering a white crystal, solvents were evaporated in vacuum and a viscous residue was distilled under vacuum. The distilled product was heated at 140°–150° C. for 18 hours in the presence of 3 grams of sodium metal and was distilled in vacuum. A theoretical yield of TMSP of 43 percent was attained. The synthesis of TMSP was confirmed by elemental and spectroscopic analysis.

EXAMPLE 2

Tris(triphenyl silil) phosphine (TPSP) was synthesized by dissolving 1.76 grams of phosphorus and 5.06 grams of a metal alloy of sodium and potassium in 250 ml of monoglyme. The solution prepared was refluxed for 20 hours. A solution of 500 ml of monoglyme containing 50 grams of triphenylchlorosilane was added to the solution, followed by refluxing for 30 hours. The solution prepared was filtered while it was hot and then cooled with ice. A white crystal was separated out of the solution which was filtered off. The crystal was recrystallized from monoglyme three times and dried in vacuum. The crystals recovered were identified by elemental and infrared analysis as being TPSP which had a melting point of 225°–227° C. The yield attained in this reaction was 59% of theoretical.

EXAMPLE 3

A polycondensation reaction of para-aminobenzoic acid was carried out in 10 ml. of pyridine in the presence of 0.0048 moles of TMSP and 0.006 moles of hexachloroethane at room temperature. The solution prepared contained 0.004 moles of para-aminobenzoic acid. The reaction took place in a slightly exothermic state at room temperature. The polymerization was allowed to proceed at room temperature for a period of 2 hours followed by heating at 80° C for 2 hours. The reaction product was poured into 300 ml of acetone and a precipitated polymer was collected by filtration, followed by washing with excess methanol and drying in vacuum. The polymer recovered was identified by infrared analysis as being polyaminobenzoic acid. The yield attained was 21.8 percent of theoretical.

EXAMPLE 4

The procedure utilized in Example 3 was repeated in this experiment except that iodoform was used in place of the hexachlorocthane utilized in Example 3. In this experiment, polyaminobenzoic acid was recovered with the yield being 57.4 percent. This example clearly illustrates that the catalyst system of the present invention can be utilized in making polyamides at low temperatures with good yields.

EXAMPLE 5

The procedure utilized in Example 4 was repeated in this experiment except that para-hydroxybenzoic acid was polymerized in place of the p-aminobenzoic acid polymerized in Example 4. The polyester synthesized in this experiment was poly-p-hydroxybenzoic acid with the yield attained being 35.6 percent. The polyester produced was confirmed by infrared analysis to be poly-p-hydroxybenzoic acid.

EXAMPLE 6

The procedure utilized in Example 5 was repeated in this experiment except for the fact that the polymerization was carried out in the presence of 5 cubic centimeters of N-methyol-2-pyrrolidone. In this experiment yield was increased to 55.3 percent. The polyester prepared was, again, confirmed by infrared analysis to be polyhydroxybenzoic acid.

EXAMPLE 7

Aromatic polyesters of high molecular weight were prepared by the direct polycondensation reaction of dicarboxylic acids and bisphenols or hydroxybenzoic acids by using triphenylphosphine dichloride as a condensing agent. Triphenylphosphine dichloride transforms into triphenylphosphine oxide after the polycondensation and the triphenylphosphine oxide can be easily converted back to triphenylphosphine dichloride by using either oxalyl chloride or phosgene gas at room temperature. This allows for a convenient means of recycling the initiator system.

Initiator systems in which triphenylphosphine dichloride is fixed on a polymeric support would be very advantageous to industrial applications because a continuous process for the synthesis of aromatic polyesters or polyamides becomes possible by designing the process in such way that a monomer solution passes through a column of polymeric initiators containing triphenylphosphine dichloride units where the direct polycondensation takes place within the column, and resulting polymers can be eluded out of the column. After the saturation of the initiator activity, the triphenylphosphine oxide formed can be converted back to triphenylphosphine dichloride again by passing oxalyl chloride gas into the column. This recycling system for the initiator column makes the semi-continuous synthesis of polyesters or polyamides possible by alternating polymer synthesis and the conversion of triphenylphosphine oxide back to triphenylphosphine dichloride.

In this experiment triphenylphosphine dichloride was bound to polystyrene by swelling 41.8 g of polystyrene beads which were crosslinked with 2% divinylstyrene in 250 ml. of nitrobenzene and then adding 59.6 g of a solution containing 47% boron trifluoride in diethyl ether.

One hundred twenty-eight grams of bromine was then added in a dropwise fashion over a period of 30 minutes. The contents of the solution formed were allowed to react for 20 hours at room temperature. The beads were then separated and washed with various mixtures of dichloromethane and methyl alcohol. These mixtures of dichloromethane and methanol were made progressively richer in dichloromethane content. The ratio of dichloromethane to methyl alcohol in the solutions utilized contained ratios of dichloromethane to methyl alcohol of 9:1, 3:1, 2:3, 3:1, and 9:1. The beads were finally washed with pure dichloromethane and were then dried. The yield of brominated polystyrene was determined to be 68.7 grams by elemental analysis.

A portion of 18.5 g of the brominated polystyrene was swelled in 450 ml of tetrahydrofuran and 44 g of chlorodiphenyl phosphine in 150 ml tetrahydrofuran were added. 3.2 g of metallic lithium were added into the solution which was stirred at room temperature for 18 hours. After the lithium was separated by filtration, the solution was heated under refluxing for 4.5 hours. 300 ml of methanol was added into the solution and the beads were completely washed with a mixed solution of dichloromethane and methanol and dried.

The beads fixed with triphenylphosphine units were obtained in a yield of 23.9 g. It was determined by elemental analysis that almost theoretical amounts of triphenylphosphine units were incorporated into the polystyrene beads.

A portion of the beads produced (20 g) were swelled in 60 ml of a solution of dichloromethane and methanol (equal volume ratios) and 80 g of peracetic acid solution obtained from 31% hydroperoxide and acetic anhydride, were added drop by drop with cooling and the reaction was continued for 4 hours at room temperature in order to oxidize triphenylphosphine units. The beads containing triphenylphosphine oxide units were dipped into 100 ml of monochlorobenzene containing 10 g of oxalic chloride and the solution was stirred for 5 hours at room temperature so as to convert triphenylphosphine oxide units into triphenylphosphine dichloride units. The beads were washed with dichloromethane ($CH_2Cl_2$) completely and dried. Yield of the beads was 24.9 g. The beads produced contained pendant diphenylphosphine dichloride groups and had the structural formula:

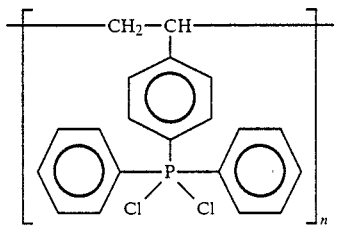

EXAMPLE 8

Polystyrene beads containing pendant diphenylphosphine dichloride groups were also synthesized by utilizing a Grignard reaction. In this example a portion of 14.6 g of magnesium powder was reacted with 3 ml of ethylbromide in 10 ml of tetrahydrofuran (THF) under a nitrogen atmosphere. 41 g of p-chlorostyrene in 75 ml THF was added to the Grignard solution over a period of one hour at a temperature within the range of 45°–50° C. The reaction mixture was added drop by drop to the mixed solution of monochlorodiphenyl phosphine (55.6 g) in 200 ml THF with the solution being kept in the temperature range of 5°–10° C. The reaction mixture was stirred at room temperature for one hour after the addition was completed. The reaction mixture was poured into 300 ml of cold water containing 49.5 g of ammonium chloride and the THF layer was separated from the aqueous solution. The THF solution was dried over anhydrous sodium sulfate in the presence of 0.37 g of t-butyl catechol. The THF solution was concentrated to about 200 ml, followed by pouring it into 700 ml of n-hexane and by separating the polymer from the solution.

After evaporating the THF, an oily product was obtained, which was recrystallized from ethanol to yield p-styryldiphenylphosphine. The p-styryl diphenylphosphine obtained was polymerized in 50 ml of benzene at 60° C. for 116 hours in the presence of 0.05 g of AIBN and 9.86 g of poly(p-styryl diphenylphosphine) were recovered by pouring the polymer solution into excess methanol, followed by washing with methanol and by drying in vacuum. The procedure utilized to obtain poly(p-styryl diphenylphosphine dichloride) was the same as the procedure specified in Example 7.

EXAMPLE 9

In this experiment glass beads containing pendant diphenyl phosphine dichloride groups were prepared. In this procedure a portion of 50 g of glass beads of 40 mesh sizes was soaked with 200 ml of THF containing 7.2 g of triphenylphosphine dichloride (0.02 mol) and 2.02 g of triethylamine (0.02 mol). The soaking procedure was continued for one day at room temperature. The glass beads were separated by filtration and washed repeatedly by acetonitrile to remove triethylamine salt, followed by drying in vacuum. Elemental analysis of the glass beads was difficult, but indicated the existence of carbon (2.5%) and hydrogen (0.7%) with P (color reaction with molybdenum).

EXAMPLES 10–16

In this series of experiments the initiator systems prepared in Examples 7, 8 and 9 were utilized in the polymerization of a copolyester of terephthalic acid, isophthalic acid, and bisphenol A. In this series of experiments 11.5 g of one of the initiators containing pendant diphenylphosphine dichloride groups was added to a 100 ml flask. In addition to this 30 ml of monochlorobenzene was also added. Previously, the polymeric initiators were crushed to 40 mesh size. 2.49 g of terephthalic acid and isophthalic acid was added and the suspension formed was heated under reflux conditions for 5 minutes under a nitrogen atmosphere, followed by cooling to room temperature. Then 3.42 g of bisphenol A was dissolved in the suspension. The polymerizations were initiated by adding 6.07 g of triethyl amine. The suspension was stirred and heated under reflux conditions for one hour. 50 ml of chloroform was then added to the suspension and the polymeric initiators were filtered off. The separated polymeric initiators were repeatedly washed with monochlorobenzene. Filtered and washed solutions were combined and an excess amount of methanol was added to the combine solutions in order to separate the polymers. The separated polymers were washed with methanol, followed by drying in vacuum.

The solvent used in these polymerizations, the origin of the polymeric initiator, the specific monomer concentration utilized, and the polymer yield attained are identified in Table I:

TABLE I

| Example | Initiator Made in Example | Solvent | Monomer Concentration (moles/liter) | Yield |
|---|---|---|---|---|
| 10 | 7 | chlorobenzene | 0.15 | 75% |
| 11 | 7 | chlorobenzene | 0.375 | 65% |
| 12 | 7 | chloroform | 0.5 | 55% |
| 13 | 7 | chlorobenzene | 1.0 | 74% |
| 14 | 8 | chlorobenzene | 0.15 | 80% |

TABLE I-continued

| Example | Initiator Made in Example | Solvent | Monomer Concentration (moles/liter) | Yield |
|---|---|---|---|---|
| 15 | 8 | chloroform | 0.15 | 71% |
| 16 | 9 | chlorobenzene | | 20% |

As can be determined by reviewing Table I, the catalysts which were supported on polystyrene and the catalyst which was supported on glass all initiated satisfactory polymerizations. In fact, the polymeric initiators utilized in this series of experiments were treated with oxalyl chloride utilizing the method described in Example 7 and were then used again to catalyze additional polymerizations. The activity of the catalysts dropped slightly on subsequent polymerizations. However, it was determined that these supported catalysts could be regenerated and used in subsequent polymerizations. This series of experiments clearly demonstrates the feasibility of using such polymeric initiators in semi-continuous polymerizations on a commercial basis at low temperatures.

Variations in the present invention are possible in light of the descriptions of it provided herein. It is, therefore, to be understood that changes can be made in the particular embodiments described which will be within the full intended scope of the invention as defined by the following appended claims.

What is claimed is:

1. A catalyst system which is particularly useful for the synthesis of condensation polymers which is comprised of (1) at least one silicon-phosphorous compound which contains at least one divalent oxygen atom which is bonded directly to a tetravalent silicon atom and a trivalent or pentavalent phosphorus atom; (2) pyridine as an acid acceptor; and (3) at least one halogenated hydrocarbon which contains at least one carbon atom which has at least two halogen atoms bonded directly to it.

2. A catalyst system as specified in claim 1 wherein the silicon-phosphorus compound is tris(trimethyl silil) phosphite.

3. A catalyst system as specified in claim 1 wherein the silicon-phosphorus compound is tris(triphenyl silil) phosphine.

4. A catalyst system as specified in claim 1 wherein the halogenated hydrocarbon contains at least one carbon atom which has at least three halogen atoms bonded directly to it.

5. A catalyst system as specified in claim 1 wherein the halogenated hydrocarbon is hexachloroethane.

6. A catalyst system as specified in claim I wherein the halogenated hydrocarbon is carbon tetrachloride.

7. A catalyst system as specified in claim 1 wherein the halogenated hydrocarbon is carbon tetrabromide.

8. A catalyst system as specified in claim 1 wherein the silicon-phosphorus Compound has the structural formula:

$$P(OSiR_3)_3$$

wherein R is an alkyl group containing from 1 to 20 carbon atoms.

9. A catalyst system as specified in claim 8 wherein R is an alkyl group containing from 1 to 8 carbon atoms.

10. A catalyst system as specified in claim 1 wherein the silicon-phosphorus compound has the structural formula:

$$R^1-P(OSiR_3)_2$$

wherein R and $R^1$ can be the same or different and are selected from the group consisting of alkyl groups containing from 1 to 20 carbon atoms, aryl groups containing from 1 to 20 carbon atoms, and alkylaryl groups containing from b 1 to 20 carbon atoms.

11. A catalyst system as specified in claim 1 wherein the silicon-phosphorus compound has the structural formula:

$$\begin{array}{c} R^1 \\ \phantom{R}\diagdown \\ \phantom{RRR}P-O-SiR_3 \\ \phantom{R}\diagup \\ R^2 \end{array}$$

wherein R, $R^1$ and $R^2$ can be the same or different and are selected from the group consisting of alkyl groups containing from 1 to 20 carbon atoms, aryl groups containing from 1 to 20 carbon atoms, and alkylaryl groups containing from 1 to 20 carbon atoms.

12. A catalyst system as specified in claim 1 wherein the silicon-phosphorus compound has the structural formula:

$$X_2P(OSiR_3)_3$$

wherein X is a halogen atom and wherein R is selected from the group consisting of alkyl groups, alkylaryl groups and aryl groups containing from 1 to 20 carbon atoms.

13. A catalyst system as specified in claim 1 wherein the silicon-phosphorus compound has the structural formula:

$$X_2P-OSiR_3$$

wherein X is a halogen atom and wherein R is selected from the group consisting of alkyl groups, alkylaryl groups and aryl groups containing from 1 to 20 carbon atoms.

14. A catalyst system as specified in claim 1 wherein the silicon-phosphorus compound is a polymer having the structural formula:

$$\left[\begin{array}{c} O-SiR_3 \\ | \\ P=N \\ | \\ O-SiR_3 \end{array}\right]_n$$

wherein R is an alkyl group, an aryl group, or an alkylaryl group and wherein n is an integer from about 10 to about 1000.

15. A catalyst system as specified in claim 1 wherein the silicon-phosphorus compound is a polymer having the structural formula:

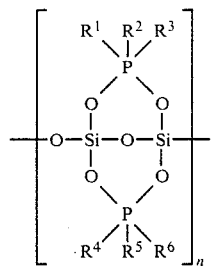
wherein n is an integer from about 10 to about 1000 and wherein $R^1$, $R^2$, $R^3$, $R^4$, $R^5$, and $R^6$ can be the same or different and are selected from the group consisting of alkyl groups, alkylaryl groups and aryl groups which contain from 1 to 10 carbon atoms.
16. A catalyst system as specified in claim 2 wherein the halogenated hydrocarbon is hexachloroethane.
* * * * *